US007080738B2

(12) United States Patent
Gambini

(10) Patent No.: US 7,080,738 B2
(45) Date of Patent: Jul. 25, 2006

(54) DEVICE FOR THE ELIMINATION OF TRIMS OF ROLLS OR LOGS OF SHEETED MATERIAL

(76) Inventor: Giovanni Gambini, Via A. Omodeo 7, I - 56124 Pisa (IT)

( * ) Notice: Subject to any disclaimer, the term of this patent is extended or adjusted under 35 U.S.C. 154(b) by 296 days.

(21) Appl. No.: 10/628,832

(22) Filed: Jul. 28, 2003

(65) Prior Publication Data

US 2004/0020343 A1 Feb. 5, 2004

(30) Foreign Application Priority Data

Jul. 30, 2002 (IT) ............................ MI200A1703

(51) Int. Cl.
*B07C 5/06* (2006.01)
*B65G 15/12* (2006.01)

(52) U.S. Cl. ....................... 209/620; 209/621; 209/622

(58) Field of Classification Search ........ 209/620–622, 209/626, 657, 665, 668, 905; 83/89, 100; 198/460.2, 588, 812, 626.1
See application file for complete search history.

(56) References Cited

U.S. PATENT DOCUMENTS 4,462,287 A 7/1984 Weis et al.
5,475,917 A * 12/1995 Biagiotti ....................... 29/822
6,371,304 B1 * 4/2002 Gambini ...................... 209/620
2002/0000400 A1 1/2002 Biagioni et al.
2003/0015077 A1 * 1/2003 Betti et al. .................... 83/100

FOREIGN PATENT DOCUMENTS

EP 0 668 132 8/1995
EP 0 982 106 3/2000
EP 1 136 198 9/2001

OTHER PUBLICATIONS

EPO Search Report for EP 03 07 7356, Sep. 23, 2003.

* cited by examiner

*Primary Examiner*—Joseph Rodriguez
(74) *Attorney, Agent, or Firm*—Hedman & Costigan

(57) ABSTRACT

A device for the elimination of trims of rolls or logs of sheeted material able to be arranged downstream of a cutting-off machine of at least one roll or log cut into rolls and little rolls or upstream trims (15') and/or downstream trims (15), all made to advance one after the next on a transporter (11, 11') associated with a feed plane (13, 13'), wherein the feed plane (13, 13') has an opening (17) of a size at least equal to that of the diameter of a log, in which said little rolls or upstream trims (15') and/or downstream trims (15) fall, the opening (17) being closed by a mobile wall (18) in response to a signal and/or according to a predetermined step, also foreseeing gripper elements from above (20–23) of some of said rolls (14) which are only activated when said mobile wall (18) for closing said opening (17) is absent.

7 Claims, 4 Drawing Sheets

DEVICE FOR THE ELIMINATION OF TRIMS OF ROLLS OR LOGS OF SHEETED MATERIAL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION (1) Field of the Invention

The present invention refers to an improved device for the elimination of trims of rolls or logs of sheeted material, in particular which can be associated with a cutting-off machine.

(2) Description of Related Art

In the field of the production of rolls or the like of kitchen and/or toilet paper rolls of paper are realised wound on rods or cores having a predetermined diameter and height. Then, one must proceed to the cutting to size of individual rolls at their final size, also predetermined, which are ready for distribution and end use by the consumer.

It is currently known to cut these end rolls to a predetermined size through suitable cutting-off machines which receive, for example, a series of logs, arranged parallel to each other, and cut them into a plurality of short rolls, which are thus arranged in order one after the other, and they are of the required size.

Such an operation is carried out on cutting-off machines, in general through rotary blades, and has as an end result the formation of a plurality of rolls or slugs of the required size, formed by an elongated log or roll which advances step by step.

During this operation, both in the top end of the individual log or roll and in the bottom end slugs are also realised which cannot be used and are in the form of short little rolls, i.e. not of the required standard measurement. Since the finished rolls fed one after another towards the subsequent packaging, in general, these little rolls or trims deriving from the cutting of the logs must be eliminated during the evacuation of the rolls cut to measure so as not to create obstructions to packaging.

Indeed, it is clear that the presence of end little rolls or trims could even lead to the blockage of the packaging machine, not to mention the possible formation of package with the wrong number of correct and usable rolls, caused by the presence of little rolls or trims.

Precisely to try to eliminate these clear problems, complex devices have been realised and are used which allow the elimination of little rolls or trims.

A first device foresees the sucking up of all of the rolls cut to size as soon as they advance one after another, after cutting. On the other hand, the little rolls or trims, not held by the suction, are sent towards a discharge opening, when the little rolls or upstream trims and downstream trims come directly from the cutting-off machine.

The strict correlation of the elements of these devices determines a machine which is complex to construct and to synchronise. Moreover, a fine tuning of all of the accessory parts necessary both for the suction of the rolls and the transportation thereof must be foreseen. The suction which acts on the outer part of the advancing roll can also determine biting or outer damage of the product, and consequently a not totally optimal finished outer appearance thereof, according to the requirements of the end user.

A second device for the elimination of trims already known and used comprises an opening with which two planes or walls are associated to form a trap door which opens or closes the hole according to predetermined and correlated sequences. All of this takes place according to the cut product passing through be it a roll cut to size or a little roll or trim. Indeed, a first trap-door plane closes the opening, once the upstream trim has passed, and a second trap-door plane intervenes, when arrives the downstream trim, in other words when the passage of rolls cut to the correct size recommences.

This second device, although it functions well, can create problems connected to the movement in perfect synchronisation between the two trap-door planes and the transporters for advancing the rolls and the trims in order. Indeed, there is the possibility of blockage and there are problems of precise and correct fine tuning.

BRIEF SUMMARY OF THE INVENTION

The purpose of the present invention is that of realising an improved device for the elimination of trims of rolls or logs of sheeted material which can be arranged downstream of a cutting-off machine of at least one roll or log cut into rolls and little rolls or upstream and/or downstream trims which is able to solve the technical problems outlined previously.

A further purpose of the present invention is that of realising an improved device for the elimination of trims of rolls or logs of sheeted material which allows a correct elimination of upstream and downstream trims formed from logs or from the starting elongated rolls.

Yet another purpose of the present invention is that of realising an improved device for the elimination of trims of rolls or logs of sheeted material which is extremely simple in its constructive structure and is equally easy to use.

Yet another purpose of the present invention is that of realising an improved device for the elimination of trims of rolls or logs of sheeted material which can easily follow the high working rhythms of the cutting-off machine, still with a simple structure and with little synchronisation.

These purposes according to the present invention are accomplished by realising an improved device for the elimination of trims of rolls or logs of sheeted material, in particular able to be associated with a cutting-off machine, as outlined in claim 1.

Further characteristics of the invention are highlighted by the subsequent claims.

The characteristics and advantages of an improved device for the elimination of trims of rolls or logs of sheeted material according to the present invention shall become clearer from the following description, given as an example and not for limiting purposes, referring to the attached schematic drawings, in which:

DETAILED DESCRIPTION OF THE INVENTION

Figure 1:
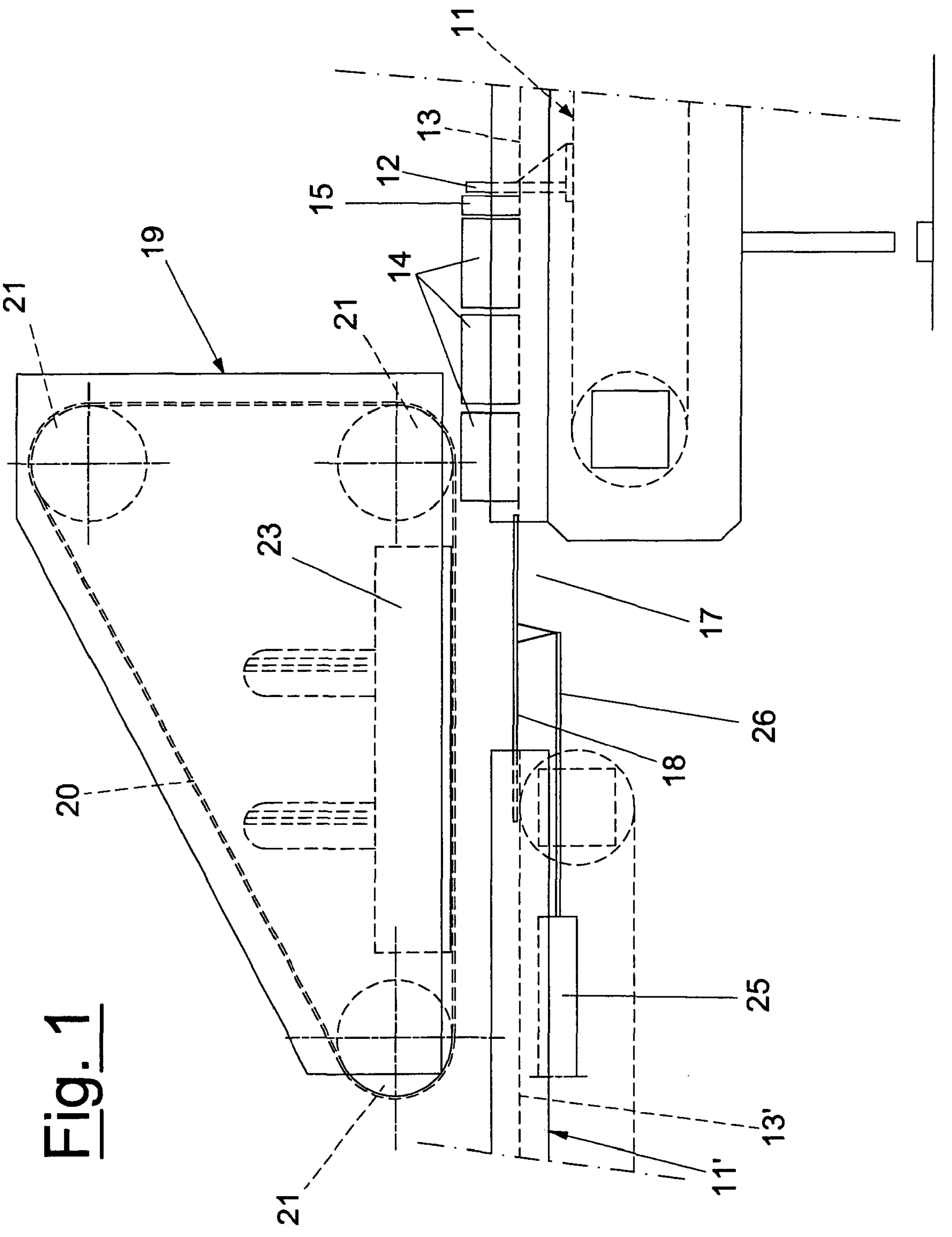
FIG. 1 is a side elevation view of an improved device for the elimination of trims of rolls or logs of sheeted material, arranged downstream of a cutting-off machine, not shown, and realised according to the present invention, in a first operating step.

With reference to the Figures, an improved device for the elimination of trims of elongated rolls, known as logs, of sheeted material, in particular of the type which can be arranged downstream of a cutting-off machine.

It is precisely in this zone that a transporter 11, for example with thrusters 12 or of another type, is arranged, which determines the advance on a feeding plane 13 of a plurality of finished rolls 14 and of little rolls or downstream trims 15 or upstream trim 15'. In the example both the rolls 14 and the little rolls or the downstream trim 15 or upstream trim 15', cut, in a row one behind the next and arranged to slide in channels 16, are made to advance by the thrusters 12 towards a packaging zone (not shown). The elevation views show the device according to just one row, but the device can of course be used for many parallel rows, all coming out from a cutting-off machine (not shown).

The thrusters 12 slide in the channels 16 of the feed plane 13 and this feed plane faces a second feed plane or an end part thereof, indicated with 13'. In this second feed plane or in the end part 13' of the first feed plane 13 a second transporter is foreseen, schematized at 11', also for example using thrusters 12'. This transporter 12' takes forward the rolls 14, once a discharge opening 17 for the little rolls or downstream trims 15 or upstream trims 15' foreseen between the two transporter parts or between the two transporters 11 and 11', has been passed.

The opening 17 is of a size at least equal to that of the diameter of a log, and the little rolls or upstream trims 15' and downstream trims 15 fall in it.

Moreover, according to the invention, the opening 17 is closed by a mobile wall 18 which, for example, translates level with or below the end part of the first feed plane 13 or second feed plane 13'. Such a translation takes place in response to a signal and/or according to a predetermined advancing step of the two transporters 11 and 11' and is determined, for example, by an actuator, such as a cylinder 25. A stem 26 of this cylinder 25 is indeed hinged below the mobile wall 18 and determines its movement forward and backward to close and open the opening 17 between the transporters 11, 11'. Alternatively, the actuator is a brushless motor or at least a motorised linear actuator.

It should also be noted how, according to the invention, above the zone in which the opening 17 is foreseen, gripper elements are foreseen, wholly indicated with 19. These gripper elements 19 intervene from above on a few of the rolls 14 and are activated only when the mobile wall 18 arranged to close the opening 17 is absent.

These gripper elements 19 in the example shown consist of bands 20, wound in a ring around pulleys 21, equipped with holes 22 which pass at a suction box 23. This suction box 23 is indeed arranged in a zone above the opening 17. One of these pulleys 21 is connected to a motor 24 which thus actuates the bands 20 into rotation.

The gripper elements 19 can alternatively be gripper elements with pincers which collect the single roll 14 or groups of rolls 14 for a certain time and a certain limited space, at least until the mobile wall 18 repositions itself to close the opening 17.

After this, indeed, the gripped rolls 14 are released above the wall 18 or else above the end part of the first feed plane 13 or second feed plane 13' towards packaging.

The operation of a device according to the present invention can immediately be understood.

Indeed, the log or logs are made to advance towards a cutting-off machine where they are reduced to finished rolls 14.

This cutting operation, as stated, besides the rolls 14, also generates little rolls or downstream trims 15 or upstream trims 15'. All of these elements 14, 15, 15' are made to slide in the channels 16 through the thrusters 12.

These trims or little rolls 15 and 15' need, as stated, to be eliminated before packaging in the production line.

For such a purpose, having carried out the cutting of the log(s), the rolls 12 and the little rolls 21 advance towards the device of the present invention, as shown in the Figures, on the feed plane 11.

Then one or more little rolls 15', parallel to each other on many rows, at the top end of the rolls 14 cut from the log(s) arranged in order one after the next, advances in the various channels.

At this point, as shown in FIG. 1, regardless of the trim or upstream little roll 15', the opening 17 is closed by the wall 18. The rolls thus advance thrusted by the thrusters 12 which also act on little rolls or downstream trims 15.

Figure 2:
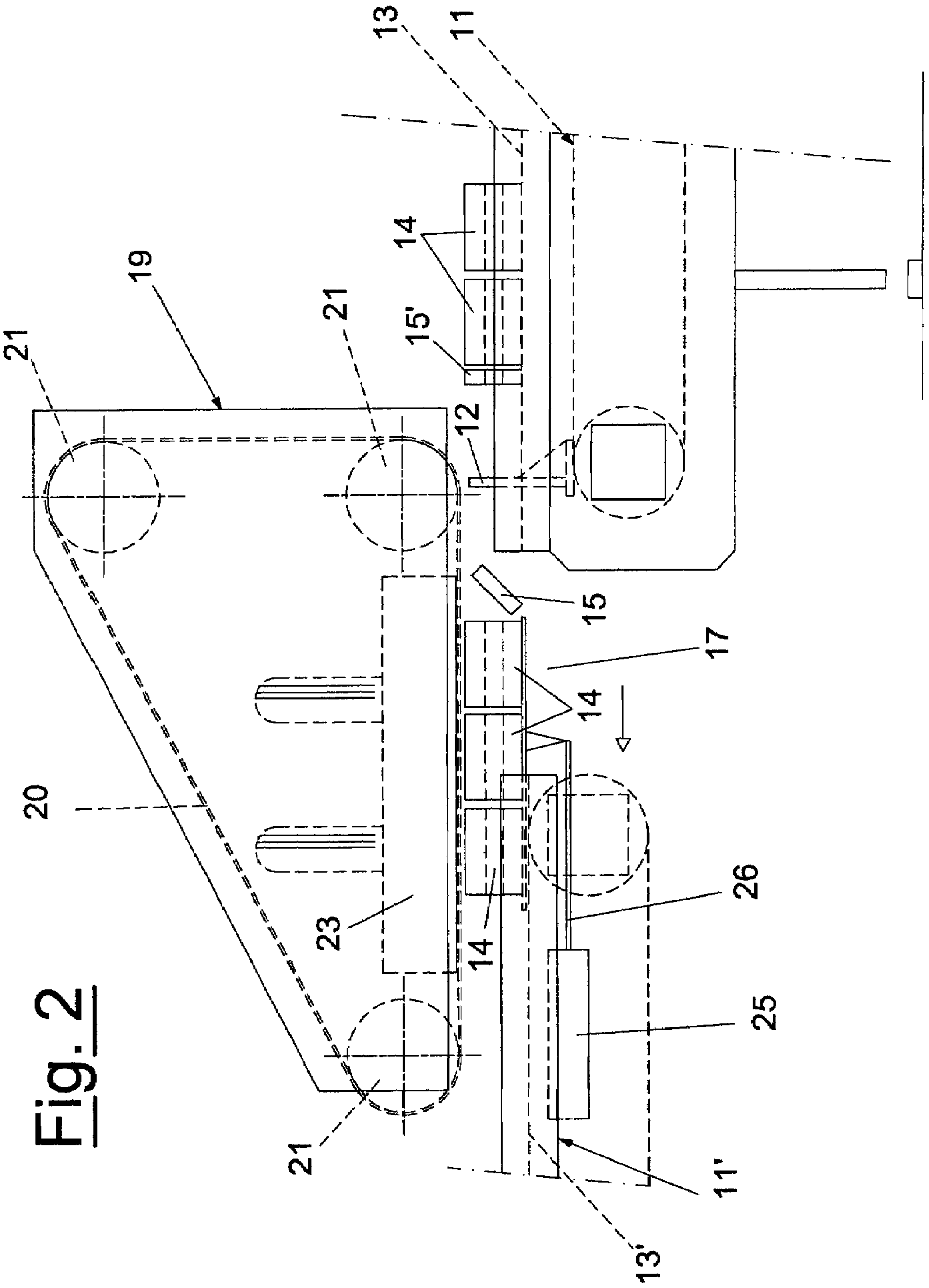
FIG. 2 is a side elevation view similar to that of FIG. 1 in a step of elimination of the downstream trim.

As stated, according to a predetermined advancing step of the transporter 11 or else in response to a signal the translation of the wall 18 takes place to free the opening 17 (FIG. 2).

The little rolls or trims 15 thus fall in this opening 17 and the thrusters 12 of the transporter 11 turn backwards crossing the lower branch of the transporter itself.

Immediately afterwards, the trims or upstream little rolls 15' of subsequent cut logs as well as rolls 14 advance.

Figure 3:
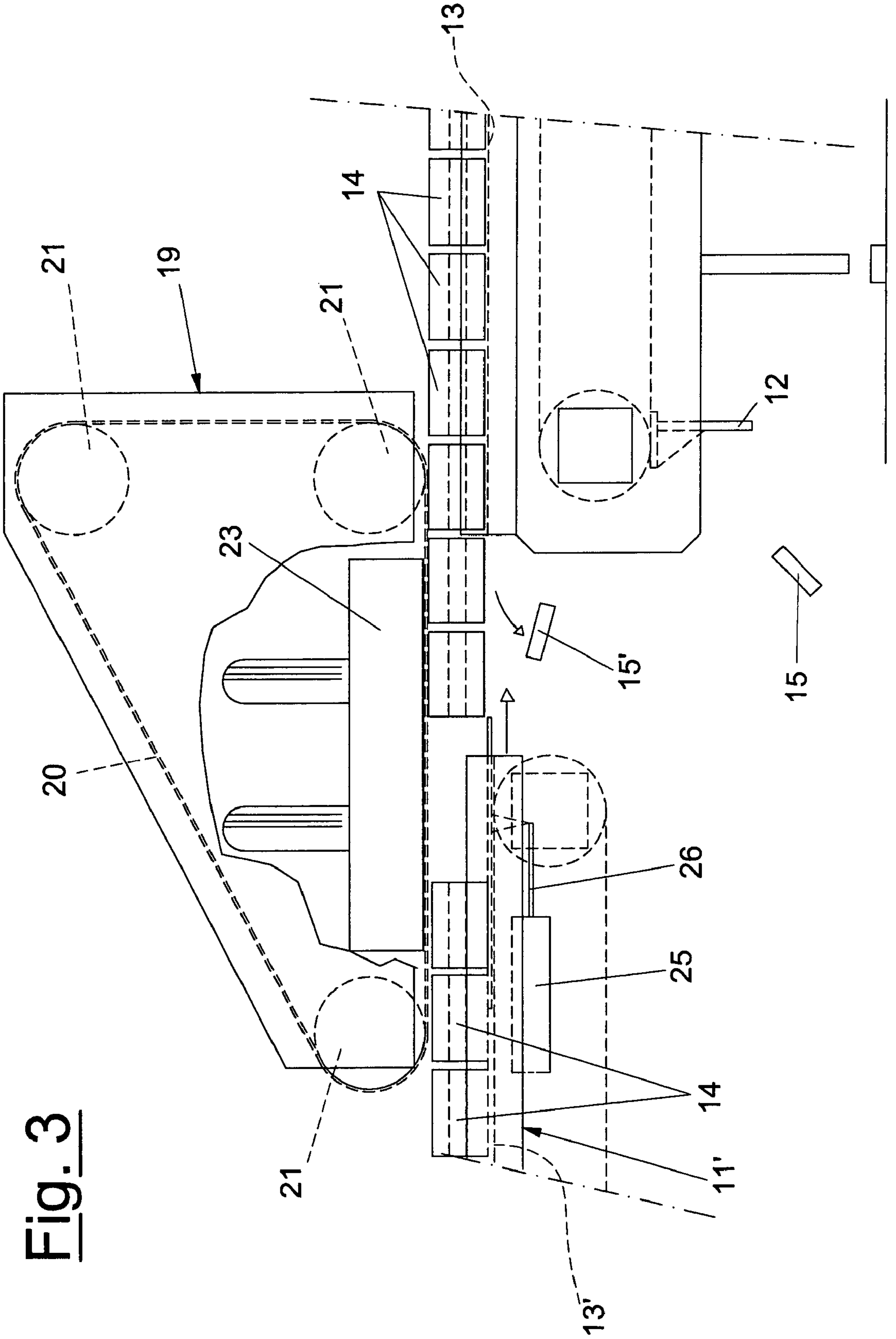
FIG. 3 is a side elevation view like that of FIG. 1 in a step of elimination of the upstream trim.
Figure 4:
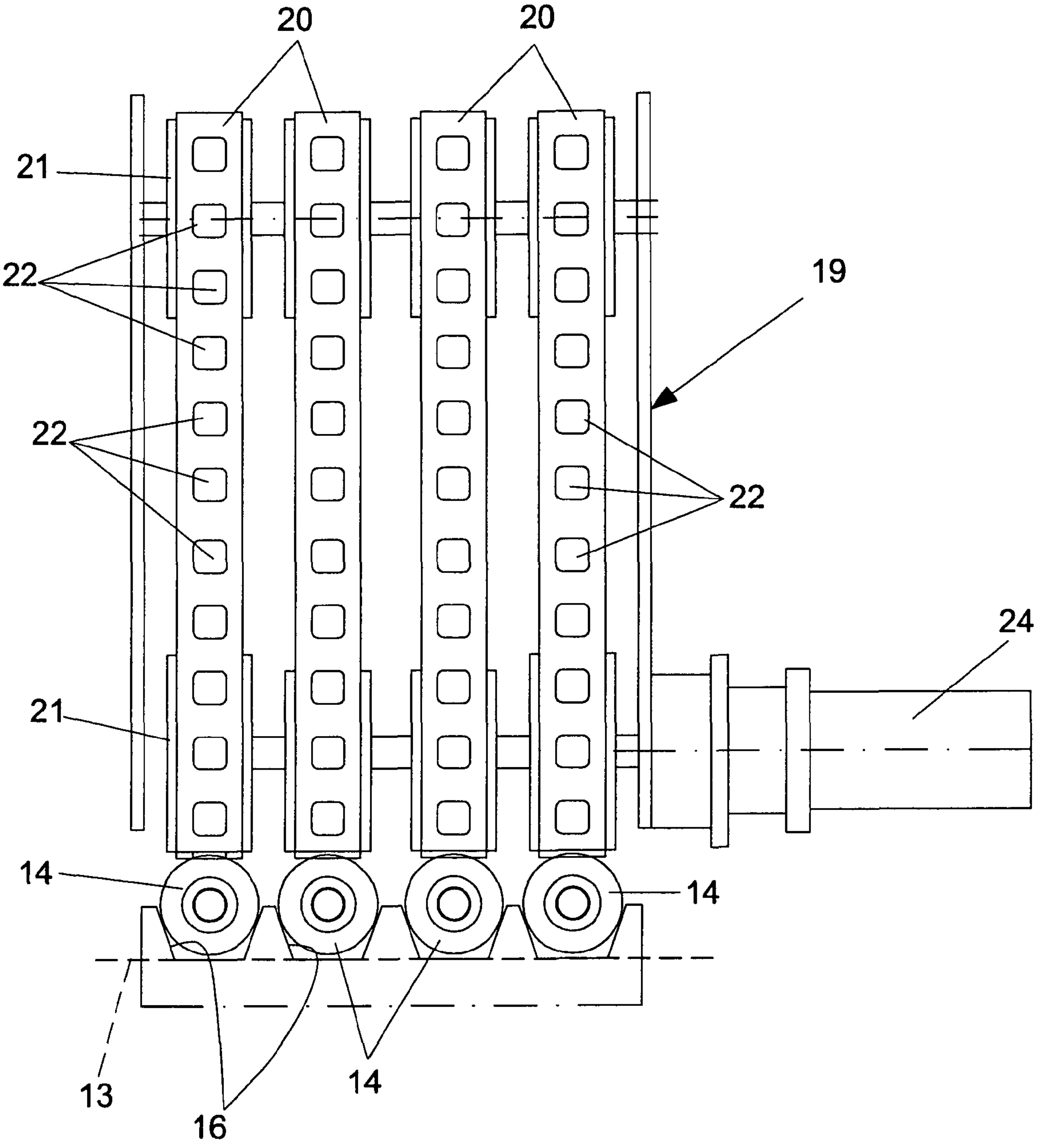
FIG. 4 is a vertical transversal view in an intermediate zone of the device of FIG. 1.

The opening 17 also receives these trims or upstream little rolls 15' and the gripper elements 19 enter into action. In the example shown in FIG. 3 the bands 20, equipped with holes 22, passing at the suction box 23 which is activated, attract some rolls 14. And this number is limited to the number of rolls 14 such as to allow the mobile wall 18 to reposition itself to close the opening 17.

At this point, with the opening 17 closed, the suction box 23 is deactivated and the rolls 14 fall and translate on the walls itself 18.

In this way there is a safe and simple removal of the little rolls or downstream trims 15 or upstream trims 15' ensuring correct packaging.

The operating cycle of the device of the present invention is completed for a cut log or else for the rolls 14 and the upstream and downstream trims 15', 15 which have been generated by the cutting-off machine.

The whole thing is also valid, as already stated many times previously, if the logs are greater in number and there are many devices or a single multiple device for the elimination of trims 15, 15'.

It has thus been seen that an improved device for the elimination of trims of rolls or logs of sheeted material according to the present invention achieves the purposes highlighted previously.

The improved device for the elimination of trims of rolls or logs of sheeted material of the present invention thus conceived is susceptible to numerous modifications and variants, all covered by the same inventive concept.

Moreover, in practice the materials used, as well as the size and components thereof, can be whatever according to the technical requirements.

The invetion claimed is:

1. A device for the elimination of trims of rolls or logs of sheeted material able to be arranged downstream of a cutting-off machine of at least one roll or log:

(i) cut into rolls and little rolls or upstream trims (15') and/or downstream trims (15), (ii) all made to advance one after the next on a transporter (11, 11') associated with a feed plane (13, 13'), characterised in that said feed plane (13, 13'):

(i) has an opening (17) of a size at least equal to that of the diameter of a log, in which said little rolls or upstream trims (15') and/or downstream trims (15) fall, (ii) said opening (17) being completely closed by a mobile wall (18) that moves forward and backward in response to a signal and/or according to a predetermined step, (iii) and including gripper elements from above (20–23) of some of said rolls (14) which are only activated when said mobile wall (18) for closing said opening (17) is absent.

2. The device according to claim 1, characterised in that said opening (17) is arranged between a pair of transporters (11, 11') arranged at respective feed planes (13, 13').

3. The device according to claim 1, characterised in that said mobile wall (18) is displaced between a position closing said opening to a position which frees said opening.

4. The device according to claim 1, characterised in that said mobile wall (18) is displaced forward and backward to close and open said opening (17) by an actuator (25).

5. The device according to claim 4, characterised in that said actuator is a cylinder (25), a stem (26) of which is hinged below said mobile wall (18).

6. The device according to claim 1, characterised in that said gripper elements from above of some of said rolls (14) comprise:

(i) bands (20), (ii) said bands being wound in a ring around pulleys (21), and being equipped with holes (22) which pass at a suction box (23), (iii) said suction box (23) indeed being arranged in a zone above said opening (17), and having one of said pulleys (21) is connected to a motor (24).

7. The device according to claim 1, characterised in that each said transporter (11, 11') associated with a feed plane (13, 13') is equipped with thrusters (12, 12') which slide in channels (16).

* * * * *